United States Patent [19]
Maier et al.

[11] Patent Number: 5,642,802
[45] Date of Patent: Jul. 1, 1997

[54] CONVEYOR APPARATUS HAVING PIVOTABLE LOAD-BEARING ELEMENTS

[75] Inventors: Willi Maier, Kloten; Hans Schuhmacher, Niederglatt, both of Switzerland

[73] Assignee: Grapha-Holding AG, Hergiswil, Switzerland

[21] Appl. No.: 589,405

[22] Filed: Jan. 22, 1996

[30] Foreign Application Priority Data

Jan. 27, 1995 [CH] Switzerland .................... 00224/95

[51] Int. Cl.⁶ .................................................. B65G 47/38
[52] U.S. Cl. .............................. 198/370.04; 198/370.03
[58] Field of Search ....................... 198/370.03, 370.04

[56] References Cited

U.S. PATENT DOCUMENTS

| | | | |
|---|---|---|---|
| 4,586,613 | 5/1986 | Horri | 198/370.04 |
| 5,018,928 | 5/1991 | Hastlepp | 198/370.04 X |
| 5,335,767 | 8/1994 | Killer et al. | 198/370.04 |
| 5,489,017 | 2/1996 | Bonnet | 198/370.04 |

FOREIGN PATENT DOCUMENTS

| | | | |
|---|---|---|---|
| 0540464 | 8/1993 | European Pat. Off. | |
| 2373464 | 7/1978 | France. | |
| 2530501 | 1/1984 | France. | |
| 2197633 | 5/1988 | United Kingdom | 198/370.04 |
| 9315986 | 8/1993 | WIPO | 198/370.03 |

*Primary Examiner*—James R. Bidwell
*Attorney, Agent, or Firm*—Spencer & Frank

[57] ABSTRACT

A conveyor apparatus has a plurality of pivotable load-bearing elements which are disposed one behind the other and travel along an endless track that has at least one unloading station where the load-bearing elements are unloaded by a pivoting action. Two switching elements disposed at the unloading station are switchable individually between an inactive state and an active state for pivoting the load-bearing element. One of the switching elements is divided into first and second switching parts so that a load-bearing element disposed in the region of the unloading station can be operated selectively with one or the other of the switching parts for the purpose of pivoting the load-bearing element for unloading.

12 Claims, 2 Drawing Sheets

CONVEYOR APPARATUS HAVING PIVOTABLE LOAD-BEARING ELEMENTS

CROSS-REFERENCE TO RELATED APPLICATIONS

This application claims the right of priority of the filing date of Swiss Application No. 00224/95-9, filed Jan. 27, 1995, in Switzerland, the disclosure of which is incorporated herein by reference.

BACKGROUND OF THE INVENTION

The invention relates to a conveyor apparatus having pivotable load-bearing elements which can travel along an endless track and can be unloaded at an unloading station, the apparatus having two switching elements which are disposed at the unloading station and can be switched individually between an inactive and an active state. The invention further relates to a use of this apparatus.

A conveyor apparatus of this type is disclosed in European Patent Application No. EP 0 540 464 A2 and corresponding U.S. Pat. No. 5,335,767, the disclosure of which is incorporated herein by reference. The load-bearing elements are wagons or carts which each have two trays that are disposed one behind the other and can be tipped, together or individually, at an unloading station. A package is loaded onto one of the wagons at a loading station. Depending on the size of the package, it is loaded onto both, or only one of the trays of the wagon. Two switching elements for tipping the trays are disposed at the unloading station, one behind the other in the direction of travel. The switching elements can be pivoted between an active and an inactive position by means of a pneumatic cylinder. The two switching elements are equally spaced from one another.

During unloading, piece goods are typically deposited onto a further conveyor apparatus, for example an accumulation belt, laterally with an arc-shaped path. The path of the piece goods during the unloading process is particularly a function of the weight of the piece goods, which can vary considerably in postal parcels or consumer products, for example. The arc-shaped paths of the piece goods can thus vary greatly during unloading. As a consequence, an accumulator belt to be loaded, for example, must have a comparatively wide design, so that, for example, even very light piece goods that are deposited with a comparatively wide arc are deposited onto the accumulator belt.

SUMMARY OF THE INVENTION

It is an object of the invention is to provide a conveyor apparatus of the type first mentioned above which permits precise deposit of different piece goods and can nonetheless be produced at low cost and function reliably.

The above and other objects are accomplished in accordance with the invention by the provision of a conveyor apparatus, comprising: an endless track having an unloading station; pivotable load-bearing elements mounted for traveling along the endless track and being pivotable for being unloaded at the unloading station; and two switching elements disposed at the unloading station and being switchable individually between an inactive state and an active state for causing pivoting of the load-bearing elements, wherein one of the switching elements is divided into first and second switching parts so that a load-bearing element located in a region of the unloading station can be selectively operated with one of the first and second switching parts.

Staggering the two switching parts in the longitudinal direction of the track permits earlier triggering of the tipping motion for the purpose of unloading of an especially light piece good. If the two switching elements are switched into an active state, two load-bearing elements or, more precisely, two load-bearing trays of a load-bearing element can be tipped simultaneously. Very long packages can therefore be deposited onto and unloaded from two load-bearing trays of a load-bearing element. The invention thus ensures better-controlled and more precise unloading of a wide variety of piece goods. The apparatus according to the invention is particularly suited for filling at least one accumulator belt with piece goods. With better control of the unloading process, such an accumulator belt can be loaded more precisely with different piece goods arranged closely together.

BRIEF DESCRIPTION OF THE DRAWINGS

An embodiment of the invention is described below in conjunction with the drawing.

DETAILED DESCRIPTION OF THE PREFERRED EMBODIMENTS

Figure 1:
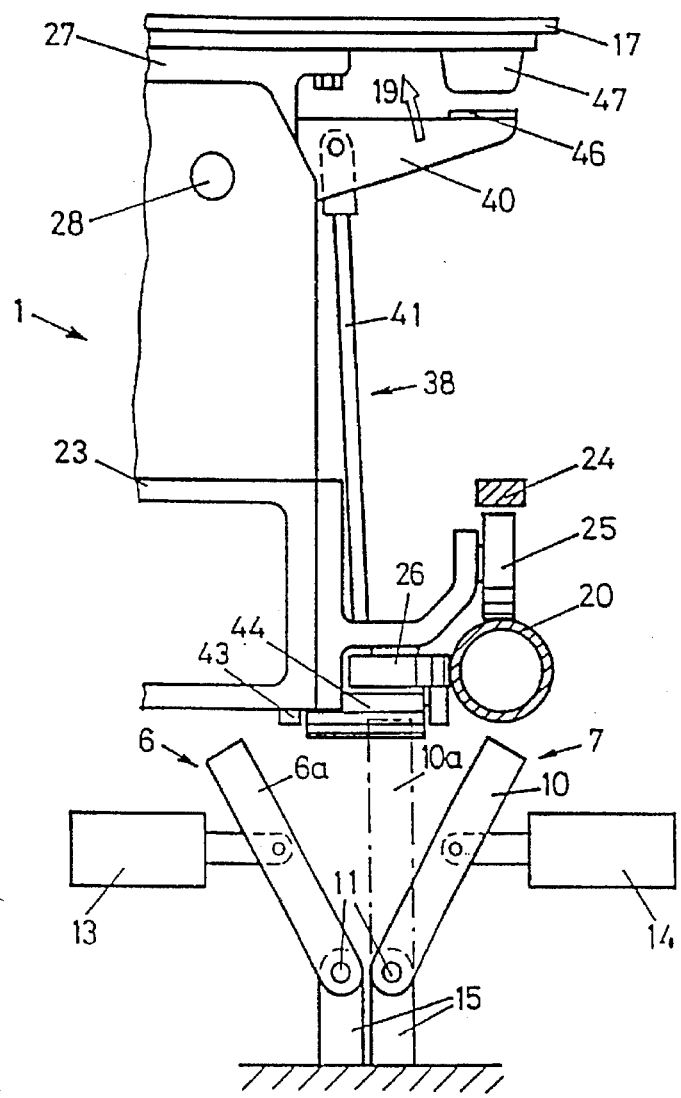
FIG. 1 is a schematic, partial view of a conveyor apparatus of the invention seen in the direction I in FIG. 2.
Figure 2:
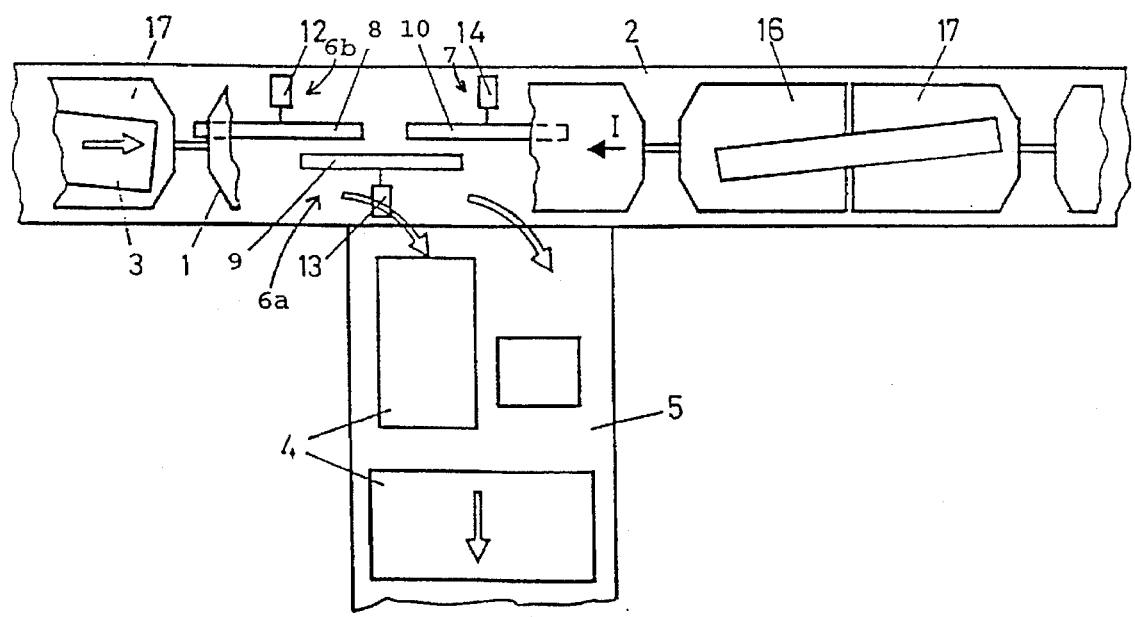
FIG. 2 is a schematic, partial plan view of the conveyor apparatus of the invention and a partial plan view of an accumulator belt.

FIG. 1 shows one half of a wagon 1, which is configured per se as described in European Application No. 0 540 464 A2 and its counterpart, U.S. Pat. No. 5,335,676. Wagon 1 in FIG. 1 is viewed in the direction of arrow I in FIG. 2. Wagon 1 is supported on parallel, tubular rails 20 (only one of which is shown in FIG. 1) by respective rollers 25 and guided with respective guide rollers 26. A guide rail 24 can be attached at an unloading station above each roller 25 to prevent tipping when dynamic forces are exerted on wagon 1.

Wagon 1 includes a wagon body 23 mounting a tray carrier 27 to which two trays 16 and 17 are pivotably seated one behind the other in the direction of travel. Wagon 1 further includes two operating elements 38, one associated with each tray 16 and 17, for releasing a lock, not shown here, and pivoting trays 16 and 17. Operating elements 38 each have an operating lever 40, which is seated on a shaft 28 and hinged to a sliding rod 41. Sliding rod 41 has a lower end which is rotatably connected with an arm 43 that is pivotably secured to body 23. An operating roller 44 is seated laterally on arm 43. If operating roller 44 is raised, sliding rod 41 is carried along and pivots operating lever 40 in the direction of arrow 19. At the same time, tray 16 or 17 is unlocked and pivoted about shaft 28, during which a disk 46 impacts against a rubber bumper 47.

Figure 3:
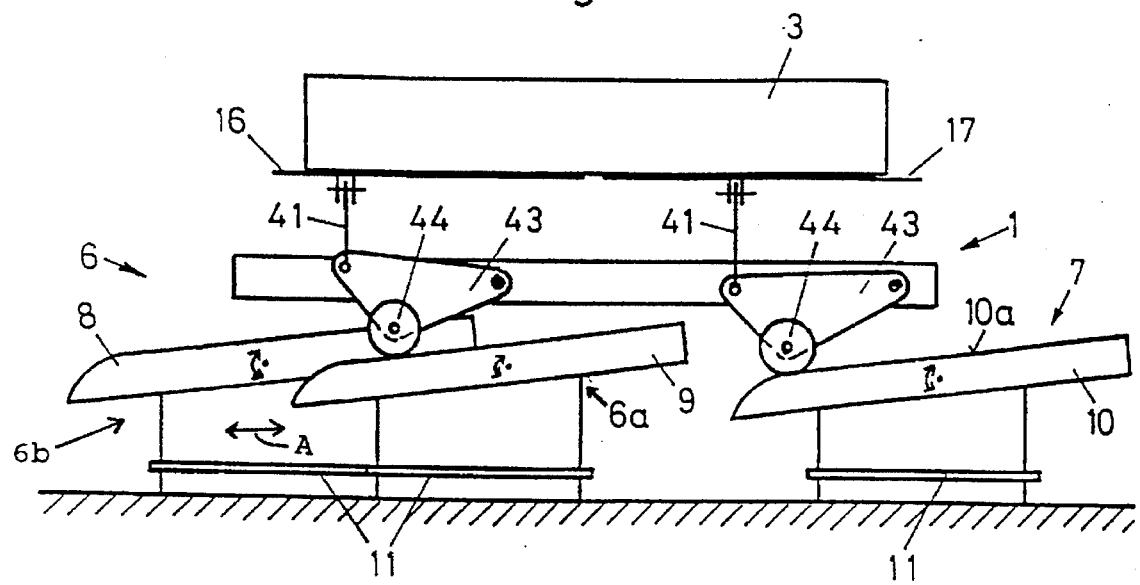
FIG. 3 is a schematic of a side view of components, including the switching elements, of the conveyor apparatus illustrated in FIG. 1.

Referring additionally to FIG. 3, two switching elements 6 and 7 are disposed one behind the other, seen in the direction of travel, for raising operating rollers 44. These elements are located at an unloading station, for example at an accumulator belt 5 according to FIG. 2. A rear switching element 7, when seen in the direction of travel, possesses a sliding member 10, which can be pivoted about a shaft 11 by means of a pneumatic cylinder 14, shaft 11 being disposed on a carrier 15. In FIG. 1 the inactive position of sliding member 10 is indicated in solid lines, and the active position is indicated in dashed lines. In the active position, when wagon 1 is in the corresponding position along track 2, roller 44 runs on a rising cam track 10a of sliding member 10, as indicated in FIG. 3. Operating roller 44 is consequently raised upwardly, and arm 43 pivots and moves sliding rod 41 hinged to arm 43 upwardly. Because of this, the corresponding tray 16 or 17 is unlocked and pivoted in a manner known per se.

Figure 4:
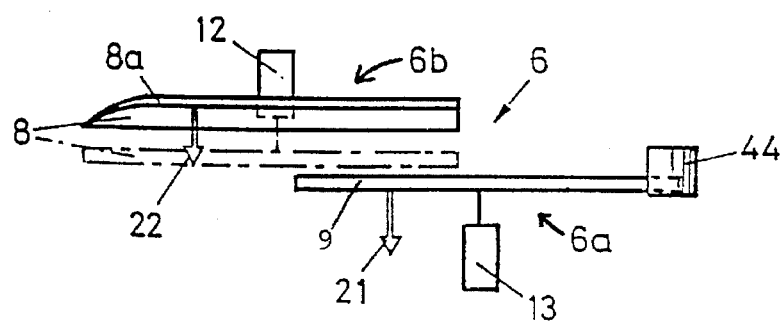
FIG. 4 is a schematic plan view of a divided switching element according to the invention.

Second switching element 6 is divided into first and second switching parts 6a and 6b, which include respective sliding members 9 and 8, which can be pivoted individually about a shaft 11, between an active and an inactive position, with pneumatic cylinders 13 and 12, respectively, or similar drives. FIG. 4 shows sliding member 9 in the active position. Operating roller 44 is located in the raised position at the end of sliding member 9. Sliding member 9 is pivoted into the inactive position in the direction of arrow 21 by means of pneumatic cylinder 13. Sliding member 8 is shown in the inactive position. The cam track 8a of sliding member 8 is located outside the track of operating rollers 44. Sliding member 8 is pivoted into the active position, shown in dashed lines, in the direction of arrow 22 by means of pneumatic cylinder 12.

Figure 5:
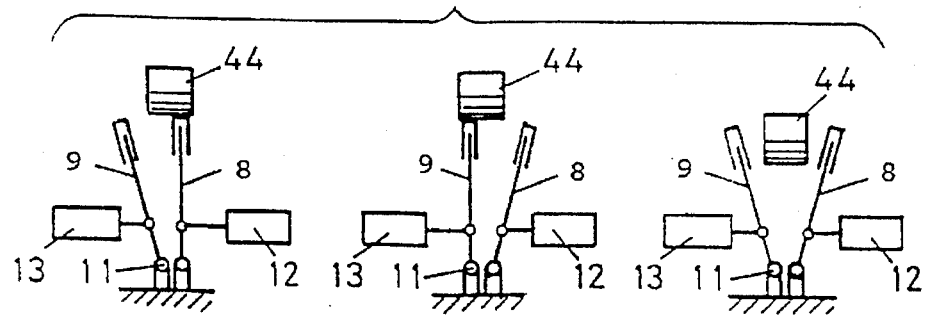
FIG. 5 is a schematic illustrating different switching positions of the divided switching element of FIG. 4.

FIG. 5 shows the three different positions of switching element 6. The two switching parts 6a and 6b are disposed, with spacing, one behind the other in the direction of travel. If roller 44 is raised with the front part 6b, the tipping motion is triggered earlier than when roller 44 is raised by rear part 9, again with respect to the direction of travel. One of the switching parts 6a or 6b is preferably displaceably disposed in the longitudinal direction of track 2, so that the time of triggering is infinitely adjustable.

The two sliding members 9 and 10 shown in FIG. 3 are preferably fixedly mounted, whereas the sliding member 8 is displaceably mounted as represented by double headed arrow A. The spacing between the sliding members 9 and 10 is thus fixed and set for unloading a wagon 1 that has two trays 16 and 17 for depositing an excessively long package 3. The two trays 16 and 17 can be essentially simultaneously pivoted with two sliding members 9 and 10 located in active positions for the purpose of unloading. If two individual piece goods are transported on the trays 16 and 17 of the wagon 1, they are preferably unloaded by means of the sliding members 8 and 9. The further track of light packages with respect to an excessively long package 3 is taken into consideration by the earlier release of the two trays by the sliding members 8 and 9. An excessively long package can thus be unloaded with the sliding members 9 and 10 at an appropriately later time corresponding to its narrower deposit track.

In the initial position, preferably all of the sliding members 8, 9 and 10 are in the inactive position and are thus pivoted outwardly. As can be seen, the path for pivoting the sliding members into the active position is very short, so that switching can take place very quickly, which permits a correspondingly high conveying speed. Another crucial point is that the load respectively acting on a sliding member 8, 9 or 10 from a roller 44 to be raised stresses the corresponding shaft 11 and not the corresponding cylinders 12, 13 or 14.

In accordance with a modification of the invention, at least one of the sliding members 8, 9 or 10 is adjustable in inclination, for example by pivoting around their respective axes as shown. The adjustment can likewise be effected, for example, with pneumatic cylinders not shown here. This permits setting of the pivoting speed and thus achieving an especially gentle or very rapid deposit.

An embodiment in which the sliding members 8, 9 and 10 do not pivot, but are displaced laterally, is also conceivable. For a person skilled in the art, it is clear that the rollers 44 and the sliding members 8, 9 and 10 can be interchanged.

While the invention has been described in conjunction with specific embodiments thereof, it is evident that many alternatives, modifications and variations will be apparent to those skilled in the art in light of the foregoing description., Accordingly, the spirit and scope of the appended claims is intended to embrace all such alternatives, modifications and variations.

What is claimed is:

1. A conveyor apparatus, comprising:
   an endless track having an unloading station;
   pivotable load-bearing elements mounted for traveling along the endless track and being pivotable for being unloaded at the unloading station; and
   two switching elements spaced apart in a direction of travel along the endless track, disposed at the unloading station and being switchable individually between an inactive state and an active state for causing pivoting of the load-bearing elements, wherein one of the switching elements comprises first and second switching parts that are staggered in the direction of travel along the track so that a load-bearing element located in a region of the unloading station can be selectively pivoted for being unloaded by one or the other of the first and second switching parts and the other one of the two switching elements.

2. The apparatus according to claim 1, wherein at least one of the first and second switching parts of the one switching element is mounted for being pivoted in a lateral direction with respect to the track.

3. The apparatus according to claim 1, wherein at least one of the first and second switching parts is displaceable in a direction of the track.

4. The apparatus according to claim 1, where each of the switching parts have an inclination relative to the track and at least one of the first and second switching parts is displaceable for changing its inclination.

5. The apparatus according to claim 1, wherein each of the switching parts includes an adjustable sliding member.

6. The apparatus according to claim 1, wherein the first and second switching parts are disposed adjacent to one another and are staggered in a longitudinal direction of the track.

7. The apparatus according to claim 1, wherein each of the load-bearing elements includes a roller, and the first and second switching parts each have a sliding member on which the respective rollers run in the active position of the sliding member.

8. The apparatus according to claim 7, wherein one of the sliding members is displaceable in a rightward direction and the other sliding member is displaceable in a leftward direction, seen in the longitudinal direction of the track, between the active and inactive positions, respectively.

9. The apparatus according to claim 1, wherein the load-bearing elements are wagons which include at least one pivotable bearing tray.

10. The apparatus according to claim 1, wherein the load-bearing elements are wagons each having two load-bearing trays disposed one behind the other in a direction of travel along the track and two operating elements each operatively associated with a respective one of the two load-bearing trays so that the two load-bearing trays can be selectively pivoted essentially simultaneously and one after the other with the two switching elements and with the first and second switching parts of the divided switching element for the purpose of unloading at the unloading station.

11. The apparatus according to claim 1, wherein the other one of the switching elements is mounted for being pivoted in a lateral direction with respect to the track.

12. A method of filling at least one accumulator belt with piece goods which comprises utilizing the conveyor apparatus according to claim 1.

* * * * *